United States Patent [19]

Bollinger

[11] Patent Number: 4,917,527
[45] Date of Patent: Apr. 17, 1990

[54] SNAP-LOC COUPLING DEVICE

[76] Inventor: William A. Bollinger, Rte. 2, Box 219, Manning, S.C. 29102

[21] Appl. No.: 273,813

[22] Filed: Nov. 21, 1988

[51] Int. Cl.⁴ .............................................. F16C 11/06
[52] U.S. Cl. ..................................... 403/90; 403/141; 403/142
[58] Field of Search ................... 403/90, 142, 141, 110

[56] References Cited

U.S. PATENT DOCUMENTS

| | | |
|---|---|---|
| 290,103 | 12/1883 | Paul . |
| 1,440,401 | 1/1923 | May . |
| 1,646,464 | 10/1927 | Sturrock ............................ 403/141 |
| 1,697,117 | 1/1929 | Hilstad et al. . |
| 1,907,055 | 5/1933 | Frederiksen ....................... 403/141 |
| 2,161,718 | 6/1939 | Miller . |
| 2,170,042 | 8/1939 | Vutz ................................... 403/142 |
| 2,260,995 | 10/1941 | Kruczek . |
| 2,513,027 | 6/1950 | Kruczek . |
| 2,548,055 | 4/1951 | Polley ............................. 403/142 X |
| 2,776,152 | 10/1960 | Ianuzzi . |
| 3,319,982 | 5/1967 | Schwartz . |
| 3,586,281 | 8/1969 | Schumer . |
| 4,214,724 | 6/1980 | Geiger . |
| 4,531,855 | 6/1985 | Wallis . |
| 4,561,414 | 12/1985 | Nozato . |

FOREIGN PATENT DOCUMENTS

| 131032 | 4/1929 | Switzerland ...................... 403/142 |
|---|---|---|
| 951873 | 3/1964 | United Kingdom ................ 403/142 |

Primary Examiner—Randolph A. Reese
Assistant Examiner—Peter M. Cuomo
Attorney, Agent, or Firm—Cushman, Darby & Cushman

[57] ABSTRACT

A mechanical clamping device for coupling any an object requiring infinite positioning to a fixed surface and which quickly and easily locks the object firmly in position without the use of electricity or hydraulic fluids. A triple pivoting linkage is employed which magnifies the force applied to a locking lever to thereby facilitate locking of the object in position. The ball seat configuration provides an additional force magnifier at the interface of the ball of the object being clamped and a ball seat defined within the clamping device. An adjusting screw is preferably provided for selectively varying the play between upper and lower clamping plates thereby enabling the clamping force applied to a ball within the device to be varied.

16 Claims, 3 Drawing Sheets

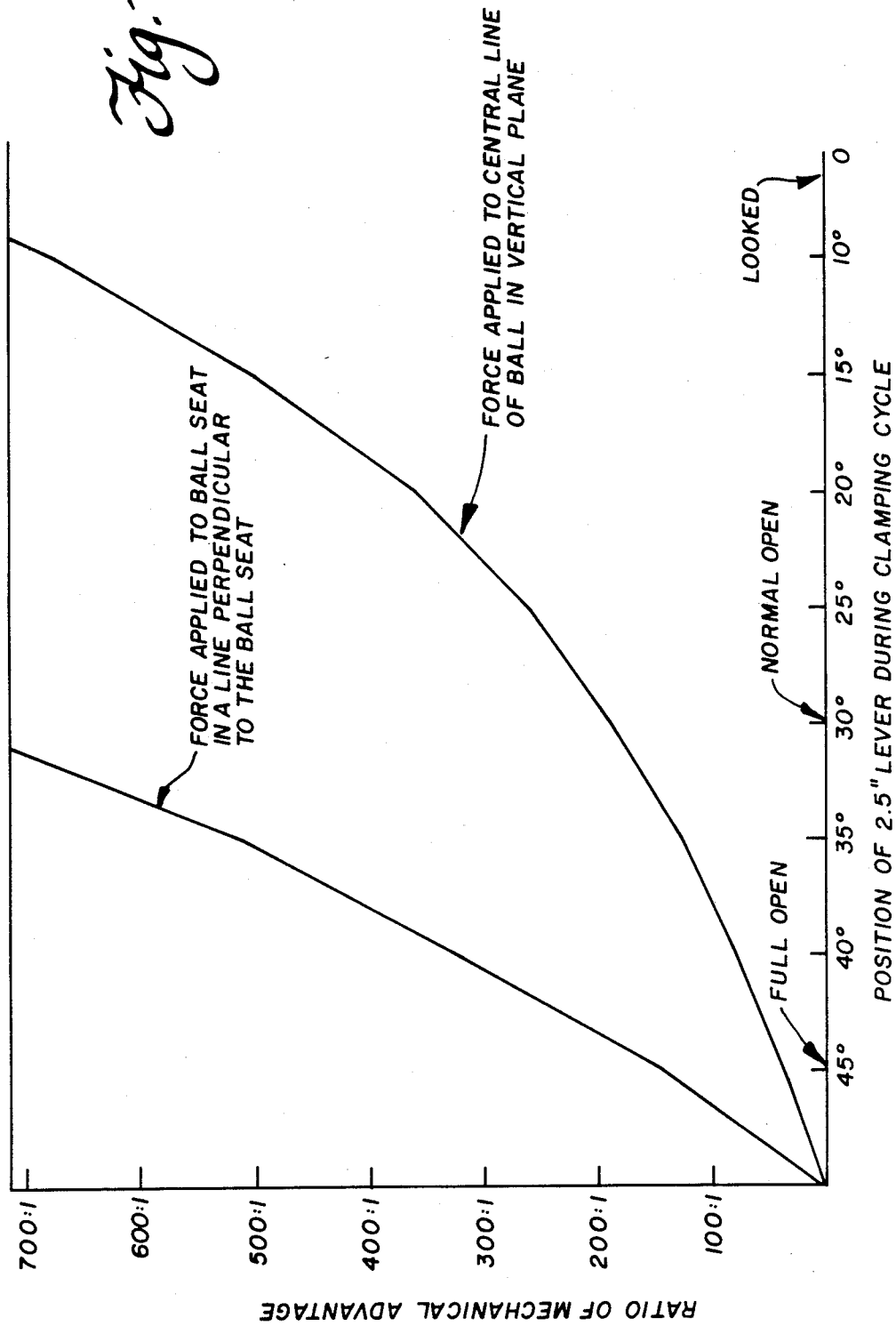

SNAP-LOC COUPLING DEVICE

BACKGROUND OF THE INVENTION

The present invention relates to coupling devices and, more particularly, to a mechanical device for coupling any an object requiring infinite positioning to a fixed surface and which quickly and easily locks the object firmly in position without the use of electricity or hydraulic fluids.

SUMMARY OF THE INVENTION

The coupling device employs a pivoting linkage and a locking lever for selectively clamping an object having a ball element and which is thereby mounted for universal positioning. The pivoting linkage is a triple pivoting linkage which magnifies the force applied by the locking lever. In addition to the force magnification made possible by the linkage configuration, the coupling device also employs a unique ball seat configuration that provides an additional force magnifier at the interface of the ball and the ball seat. More particularly, a 15 degree ball seat is preferably provided which creates a wedging effect at the interface with the ball defined on the object which magnifies the vertical force applied to the ball at a 4 to 1 ratio. The employment of the same 15 degree ball seat in the top clamping plate plus limiting the pivoting motion of that plate creates an additional anti-rotational frictional force equal to the value found in the lower fixed plate.

The "snap-loc" feature of the present invention relates to the clamping lever employed for activating the clamp device. More particularly, the clamping lever motion provides a "snap-loc" feature which provides a positive and foolproof signal to the operator that the device has been securely locked to the pre-set clamping force as determined by the pre-set position of an adjusting screw of the device. Not only does the "snap-loc" feature provide a definite signal that the clamping cycle has been completed, but this unique feature also assures precise repeatability at the completion of each clamping cycle since it is not affected in any way by the skill level or strength of the operator.

The total effectiveness of the clamping device in terms of resistance to ball and shaft movement when in a locked mode is determined by the ultimate force applied at the interface of the ball and the ball seat and the friction value or compatibility of the two materials employed. The selection of material is of course a matter of choice dependent upon the particular use of the clamping device. Finally, the ultimate force of the ball to ball seat interface can be increased or reduced within the limit of a given dimensional assembly by adjusting an adjusting screw, as noted above, which is provided to couple upper and lower plates of the clamping device together.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

BRIEF DESCRIPTION OF THE DRAWINGS

FIG. 4 is a graph showing the ratio of mechanical advantage plotted against the position of a 2.5 inch lever during the clamping cycle.

DETAILED DESCRIPTION OF THE PRESENTLY PREFERRED EXEMPLARY EMBODIMENT

Figure 1:
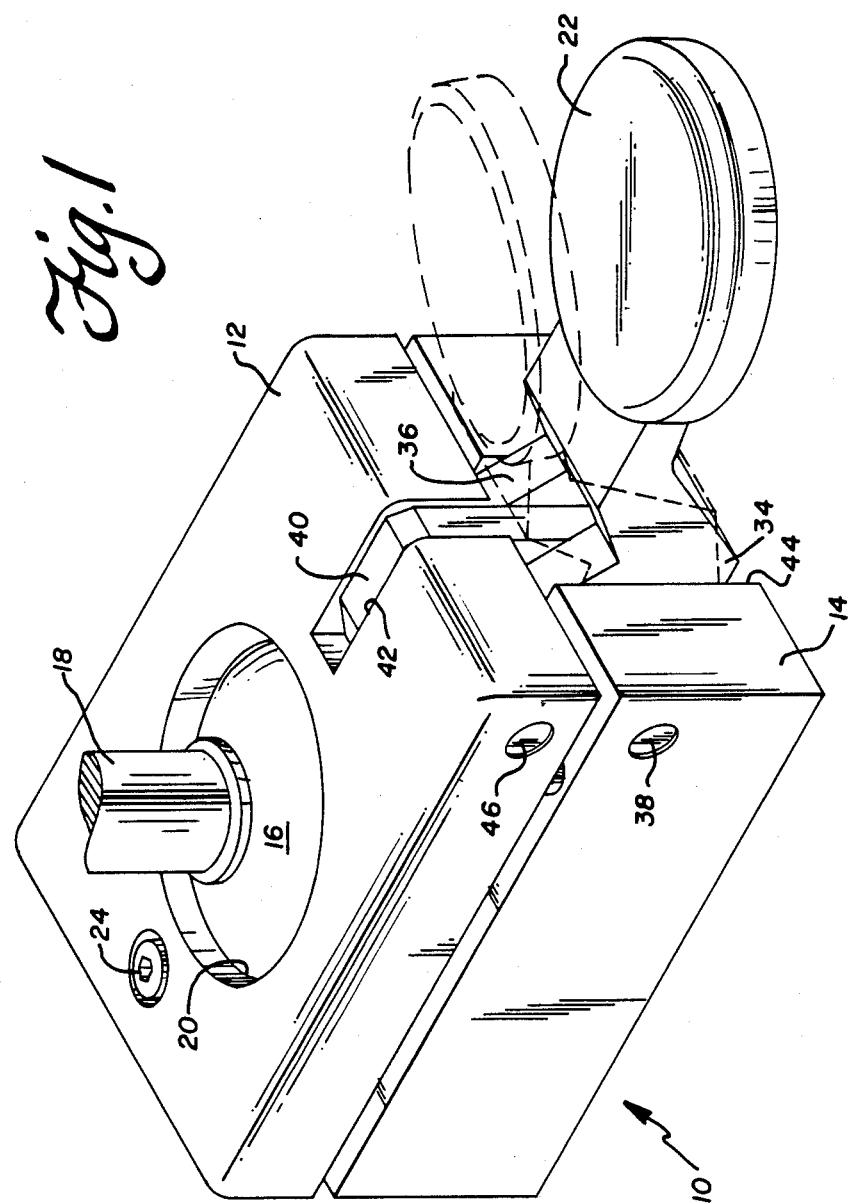
FIG. 1 is a perspective view of a clamping device provided in accordance with the present invention.

The clamping device 10 of the invention as shown in FIG. 1 includes an upper clamping plate 12 and a lower clamping plate 14. The ball portion 16 of the object 18 (broken away for clarity) to be clamped is disposed in a ball seat 20 (best seen in FIG. 3) defined between the upper and lower clamping plates 12, 14. A clamping lever 22 operatively couples the upper and lower clamping plates 12, 14 and is movable from an upper unclamped position (shown in phantom in FIG. 3) to a lower, clamped position. The clamping plates 12, 14 are also adjustably interconnected by an adjusting screw 24, as described more fully below.

Figure 3:
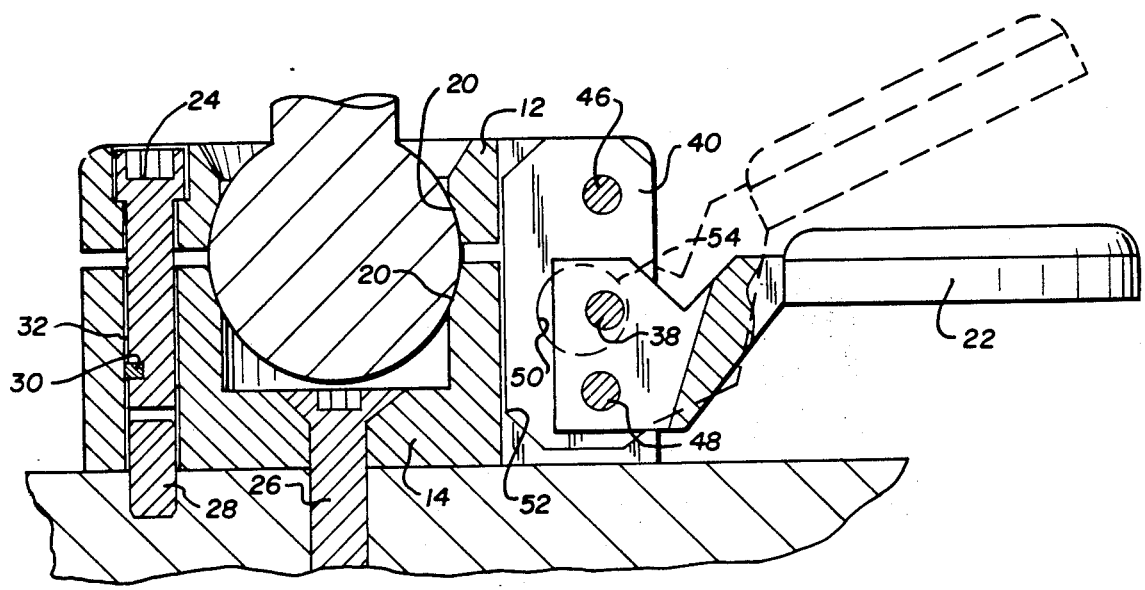
FIG. 3 is a cross-sectional view taken along line 3—3 of FIG. 2.

Referring to FIG. 3, in particular, the lower clamping plate 14 is mounted to a fixed point or structure by means of, for example, a mounting screw 26 and an anti-rotation pin 28. As noted above, the upper clamping plate 12 is mounted to the lower clamping plate 14 by means of an adjusting screw 24.

Prior to use, the adjusting screw 24 is adjusted to a point that will bring the clamping lever 22 to rest in an unlocked position at an angle which is approximately 30 degrees from the horizontal plane. In this regard, where a greater clamping pressure is desired or required, then the adjusting screw 24 can be further adjusted to bring the clamping lever 22 to a maximum inclination of 45 degrees to horizontal. In order to ensure that the adjusting screw 24 remains in a selected position during the clamping cycle, a nylon-type threadlock can be provided as shown schematically at 30. In the alternative, the screw threads 32 can be chemically treated to prevent movement due to vibration.

Figure 2:
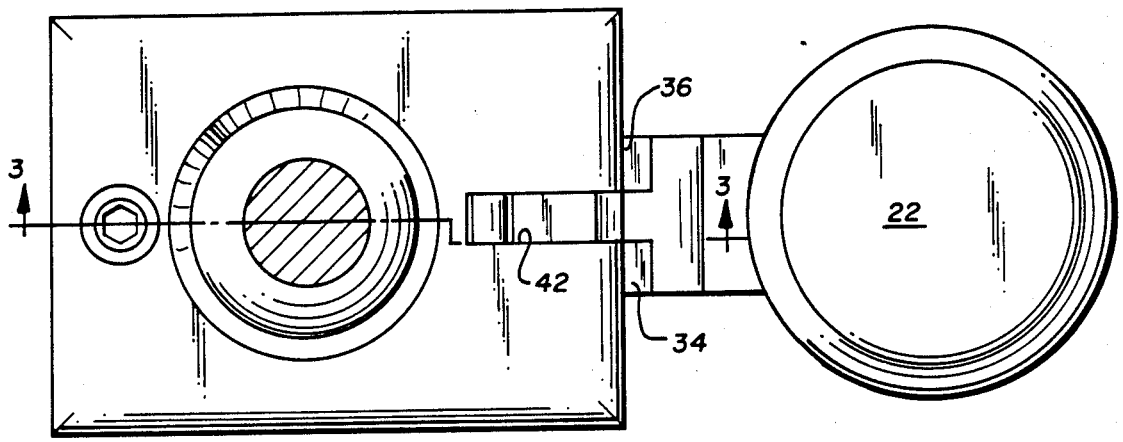
FIG. 2 is a top plan view, partly in phantom of a snap-loc clamping device provided in accordance with the present invention.

As can be seen most clearly in FIGS. 1 and 2, the clamping lever 22 has first and second legs 34, 36 which are pivotally mounted about pin 38. Pin 38 is fixed to lower clamping plate 14. A substantially planar plate element 40 is further mounted so as to be disposed between the legs 34, 36 of the clamping lever 22 and also in slots 42, 44 defined respectively through the upper and lower clamping plates 12, 14 for accommodating respectively the plate element 40 and the lever leg/plate assembly. The plate element 40 is pivotally mounted to the upper clamping plate 12 by means of a pin 46. The clamping lever 22 is pivotally coupled to the plate element 40 by means of a pin 48. Finally, plate element 40 has an aperture 50 defined therethrough which permits plate element 40 to move relative to pin 38.

As the clamping lever 22 is moved downwardly from its unlocked position (shown in phantom lines in FIG. 3) it pivots around pin 38 and a chain reaction of pivoting motions is initiated. Because pivot pin 38 is fixed to the lower plate, during the clamping motion all of the components will move in relation to pivot pin 38.

Pin 48 travels in a downward arc around pivot pin 38 as the lever is moved downwardly into its locking position. The plate element 40 is turn pulled downwardly by pin 48. Pin 46, coupled to plate element 40, is in turn pulled downwardly and the upper plate of the clamping mechanism is pulled down by the pin 46.

As the upper clamping plate 12 moves downwardly, the upper ball seat defined therewithin will come into contact with the surface of the ball 16 of an object (not shown in particular) to be clamped in position with the clamping device 10. More particularly, as upper pin 46 continues its downward travel as determined by the downward movement of pin 48, the upper clamping plate tends to pivot around the ball 16. The pivotal motion of upper clamping plate 12 is limited, however, by the pre-set position of adjusting screw 24 resulting in an ever increasing force being applied to both the ball seat interfaces as pin 48 continues its downward motion.

The clamping cycle is then completed when pin 48 brings plate element 40 to rest at 52 against the lower clamping plate. In the alternative, rather than a contact point between plate element 40 and lower clamping plate 14 as shown at 52, the locked position of the clamping device 10 can be determined by plate element 40 coming to rest against pin 38 as shown at 54.

With reference to FIG. 4, a plot of the ratio of mechanical advantage to the position of the lever during the clamping cycle is shown. Since the ratio becomes progressively higher throughout the clamping cycle, the curve has been plotted at five degree intervals from fully open through to the locked position. It is noteworthy that the ratios shown in FIG. 4 are accurate in so far as the linkage advantages are concerned. However, in actual practice or manufacture, the upper clamping plate will always be permitted to deflect by choice through selection of thickness dimensions and/or tensile strength of the material used. That being the case, it is apparent that while these forces are available within the design of the unit, the actual interface forces at the ball seat is a controllable amount which can be modified to suit a given use of the clamping device.

While the invention has been described in connection with what is presently considered to be the most practical and preferred embodiment, it is to be understood that the invention is not limited to the disclosed embodiment, but, on the contrary, is intended to cover various modifications and equivalent arrangements included with the spirited scope of the appended claims.

What is claimed is:

1. A clamping device comprising:
    a first clamping plate;
    a second clamping plate;
    means for coupling said first clamping plate to said second clamping plate;
    said first clamping plate and said second clamping plate defining therebetween a ball seat for receiving a ball-shaped element provided on an object to be clamped thereby;
    a clamping lever pivotally mounted to one of said first and second clamping plates and having an unlocked position and a locked position; and
    a plate element pivotally mounted to the other of said first and second clamping plates, said plate element further being pivotally mounted to said clamping lever,
    whereby movement of said clamping lever from said unlocked position to said locked position pivots said plate element relative to the other of said first and second clamping plates and pulls said plate element so as to urge said other of said first and second clamping plates against a ball disposed within said ball socket to thereby clamp and lock the ball relative to said first and second clamping plates.

2. A clamping device as in claim 1, wherein said clamping lever is pivotally mounted to said one clamping plate by a pin element.

3. A clamping device as in claim 2, wherein said plate element has an aperture defined therethrough for receiving said pin element.

4. A clamping device as in claim 1, wherein said plate element is pivotally mounted to said other clamping plate by a pin element.

5. A clamping device as in claim 1, wherein said plate element is pivotally mounted to said clamping lever by a pin element.

6. A clamping device as in claim 1, wherein said clamping lever has first and second leg portions, said plate element being disposed between and pivotally mounted to said leg portions.

7. A clamping device as in claim 2, wherein said clamping lever has first and second leg portions, said first and second leg portions being pivotally mounted to said one clamping plate by said pin element.

8. A clamping device as in claim 7, wherein said plate element is disposed between and pivotally mounted to said leg portions.

9. A clamping device as in claim 1, wherein said one clamping plate has a slot defined therein for receiving a portion of said clamping lever.

10. A clamping device as in claim 1, wherein said other clamping plate has a slot defined therein for receiving a portion of said plate element.

11. A clamping device as in claim 8, wherein said one clamping plate has a slot defined therein for receiving said leg portions of said clamping lever and said plate element disposed therebetween.

12. A clamping device as in claim 1, wherein said means for coupling said first and second clamping plates comprises means for adjustably coupling said clamping plates so as to vary an unlocked position of said clamping lever and to thereby vary a clamping force of the clamping device.

13. A clamping device as in claim 12, wherein said means for adjustably coupling comprises an adjusting screw.

14. A clamping device as in claim 13, further comprising means for maintaining said adjusting screw in a selected position during the clamping cycle.

15. A clamping device as in claim 14, wherein said means for maintaining comprises a nylon-type threadlock mounted to the threaded portion of said adjusting screw.

16. A clamping device comprising:
    an upper clamping plate;
    a lower clamping plate;
    means for adjustably coupling said upper clamping plate to said lower clamping plate;
    said upper clamping plate and said lower clamping plate defining therebetween a ball seat for receiving a ball-shaped element provided on an object to be clamped thereby;
    a clamping lever pivotally mounted to said lower clamping plate and having an unlocked position and a locked position; and a plate element pivotally mounted to said upper clamping plate, said plate element further being pivotally mounted to said clamping lever, said plate element having an aperture defined therethrough for allowing movement of said plate element relative to said pivotal mounting of said clamping lever to said lower clamping plate, whereby movement of said clamping lever from said unlocked position to said locked position pivots said plate element relative to the upper clamping plate and pulls said plate element so as to urge said upper clamping plate against a ball disposed within said ball socket to thereby clamp and lock the ball relative to said upper and lower clamping plates.

* * * * *